United States Patent [19]

Stephen, Jr.

[11] 3,959,620
[45] May 25, 1976

[54] ELECTRIC BARBECUE GRILL

[76] Inventor: George A. Stephen, Jr., 504 W. Sunset, Mount Prospect, Ill. 60635

[22] Filed: Nov. 7, 1973

[21] Appl. No.: 413,666

[52] U.S. Cl. ............................... 219/386; 99/401; 99/446; 99/447; 126/25 R; 126/41 R; 219/405; 219/414
[51] Int. Cl.² ...................... H05B 1/02; A47J 37/00
[58] Field of Search ........... 219/267, 270, 346, 336, 219/347, 354, 461, 446, 349, 385, 386, 405, 458–461, 443, 445, 468, 412–414; 126/25 R, 41 R; 99/385, 401, 446, 447, 337, 402

[56] References Cited
UNITED STATES PATENTS

| | | | |
|---|---|---|---|
| 2,812,706 | 11/1957 | Del Francia et al. | 219/347 |
| 2,903,549 | 9/1959 | Joseph | 126/41 X |
| 3,002,444 | 10/1961 | Hoebing | 99/337 X |
| 3,098,427 | 7/1963 | Del Francia | 99/446 |
| 3,167,642 | 1/1965 | Reis | 126/25 R |
| 3,386,433 | 6/1968 | Copeland | 219/349 UX |
| 3,479,488 | 11/1969 | Klemm | 219/336 X |
| 3,490,357 | 1/1970 | Lescure | 99/446 X |
| 3,688,758 | 9/1972 | Stephen, Jr. | 126/41 R |
| 3,785,361 | 1/1974 | Mejyr et al. | 126/41 R |

*Primary Examiner*—A. Bartis
*Attorney, Agent, or Firm*—Olson, Trexler, Wolters, Bushnell & Fosse, Ltd.

[57] ABSTRACT

An electric barbecue grill comprises a cooking vessel and a housing connected centrally thereof. Electric heating means are provided and include a heating elements mechanically mounted on a hollow member of the housing in relative positions for different cooking modes and an electrical cord disposed in the hollow member for protection. A grillwork is provided for supporting a refractory bed adjacent the heating element unit, and electric controls for selectively energizing the heating elements for different cooking modes are disposed in the hollow member to be thermally protected from heat emanating from the heating element unit and the refractory bed.

11 Claims, 10 Drawing Figures

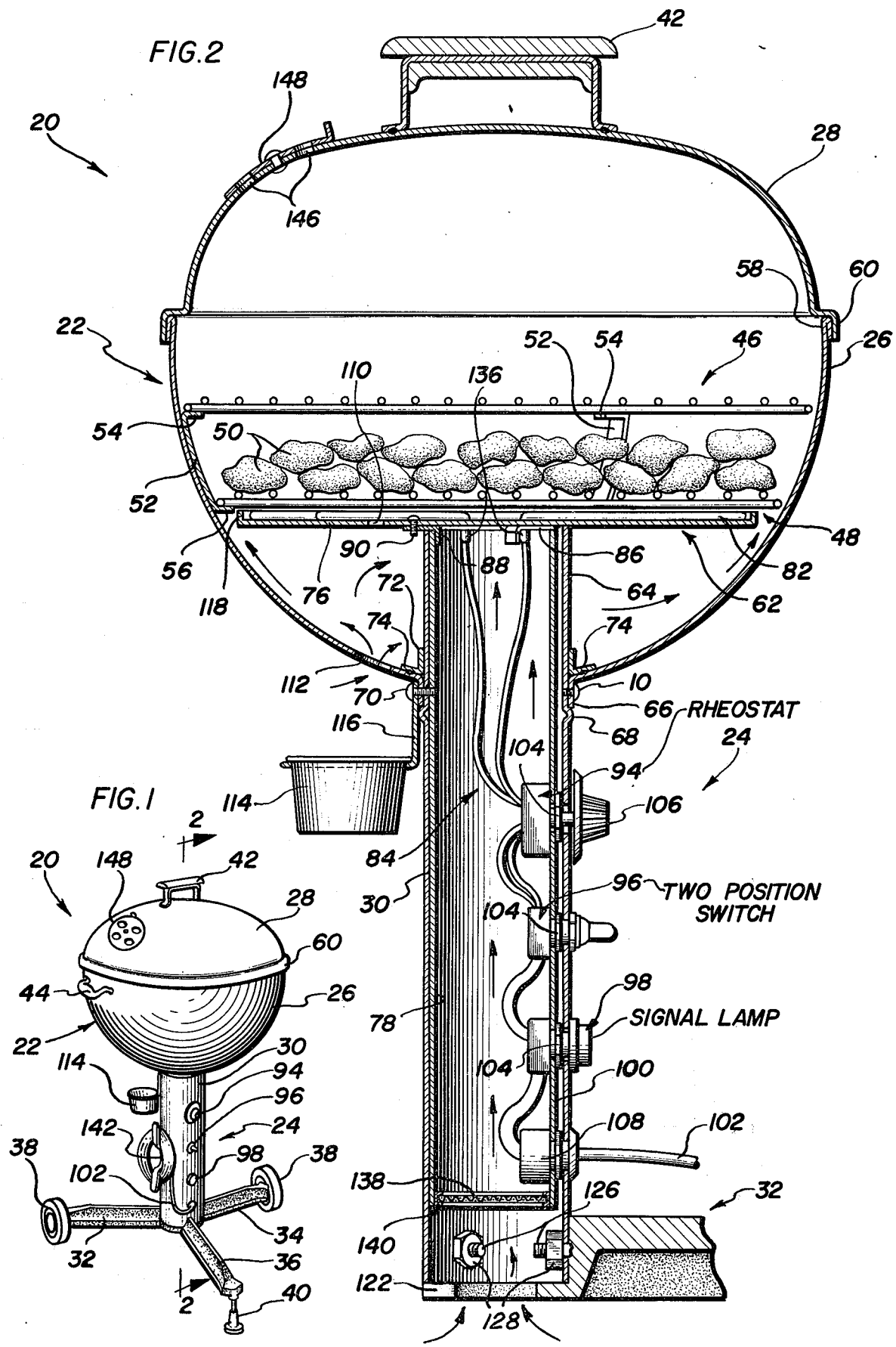

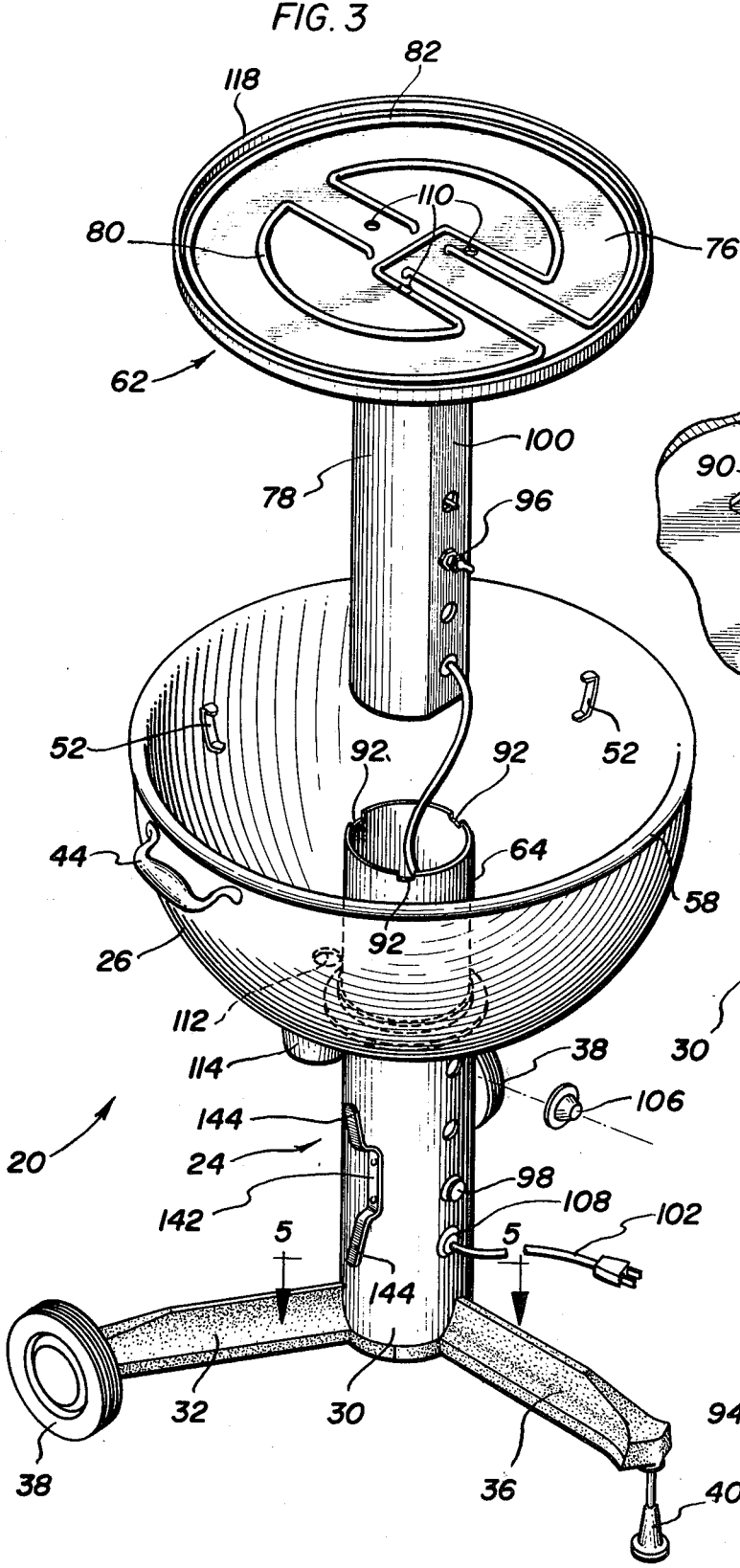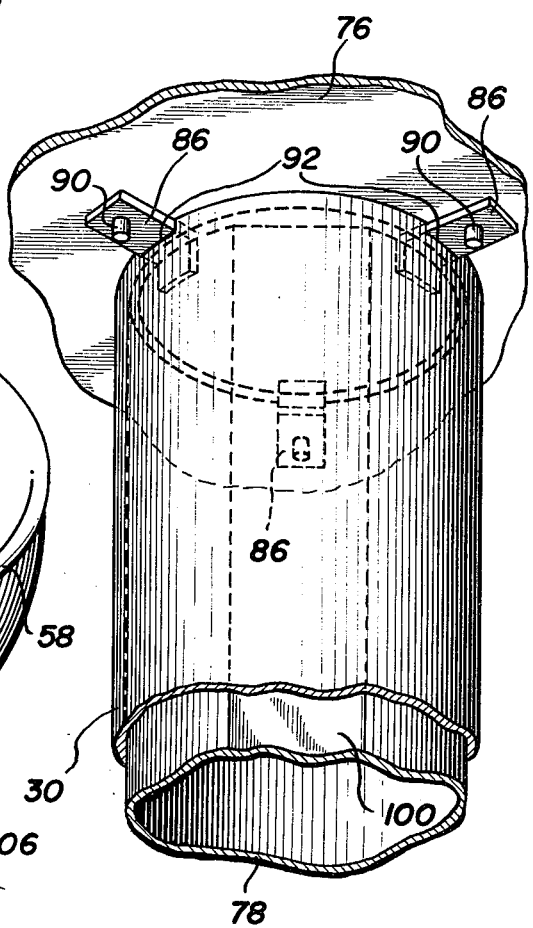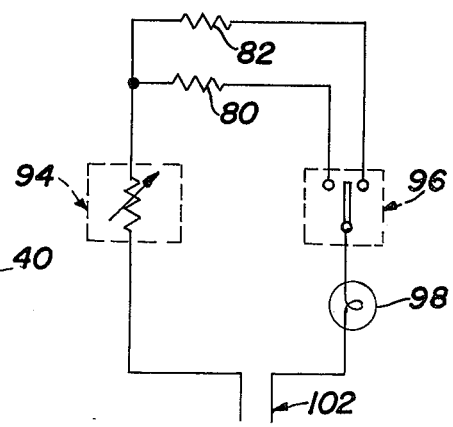

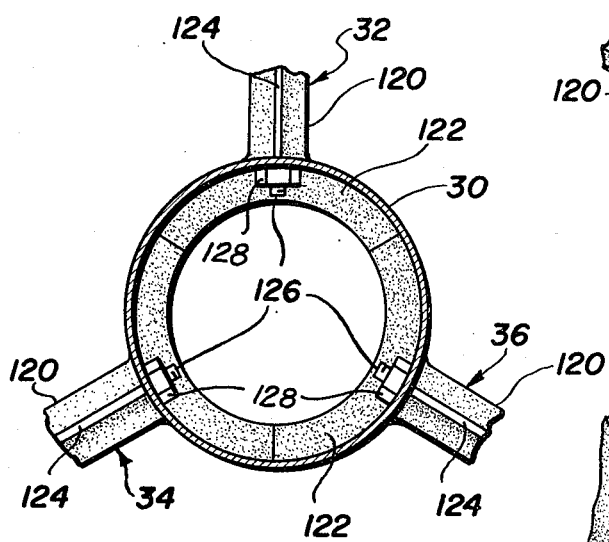
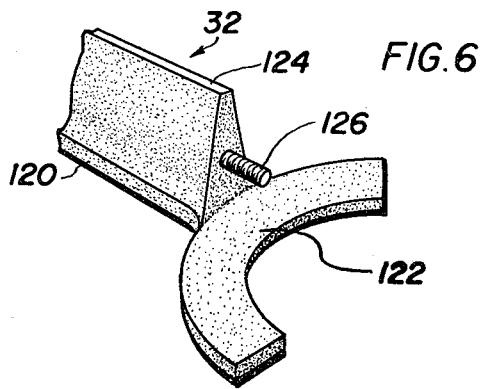
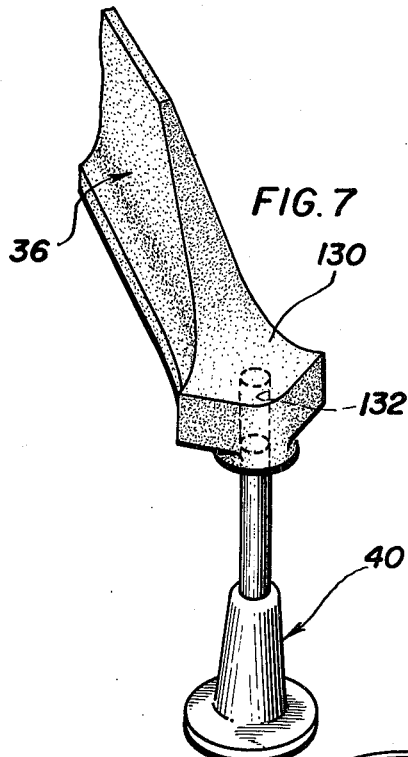
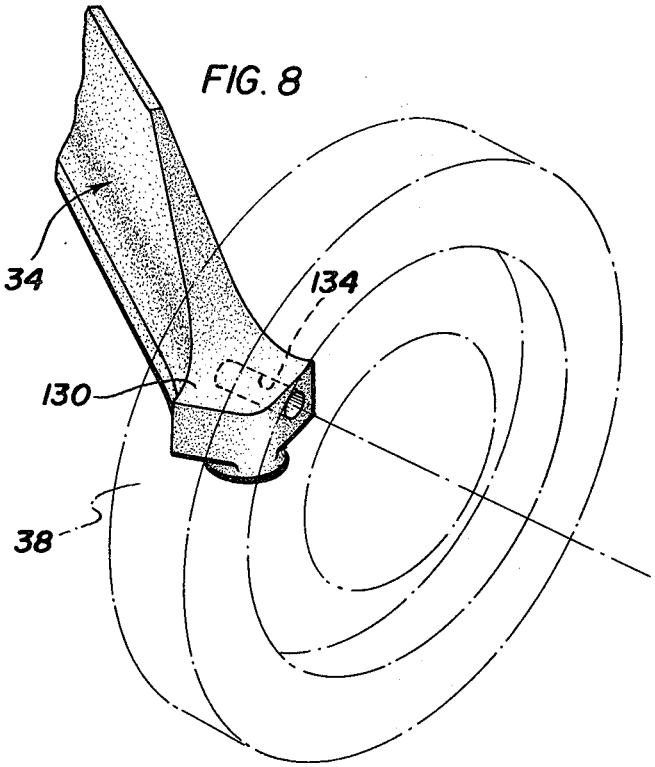
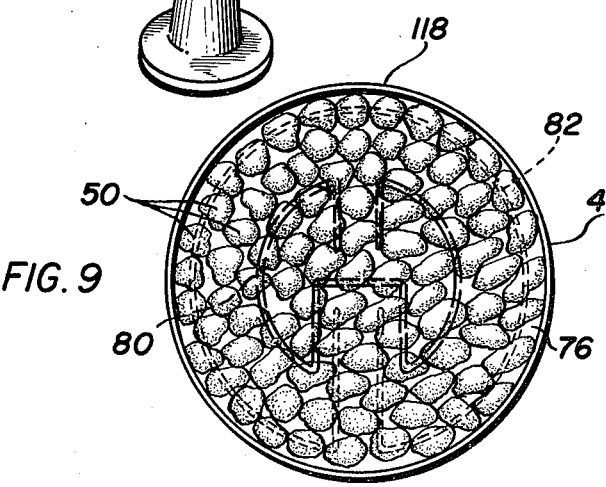
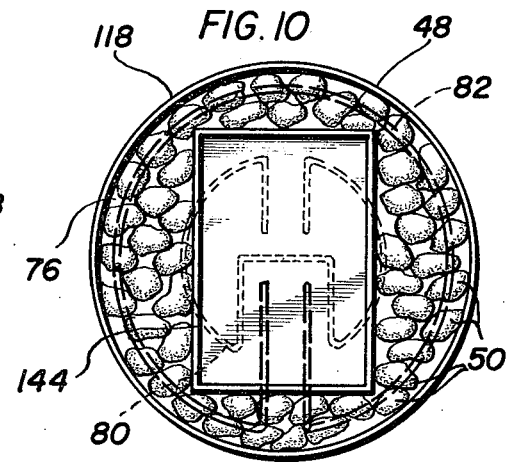

ELECTRIC BARBECUE GRILL

BACKGROUND OF THE INVENTION

This invention relates generally to electrically operated home appliances and more particularly to electric outdoor barbecue equipment.

Outdoor barbecue grills have been arranged heretofore to cook using charcoal as fuel; and at the present time, interest has also been shown in the use of gas and electricity as sources of outdoor cooking energy. However, special problems exist with respect to the utilization of ordinary household current in an outdoor cooking environment. For example, electric shock hazards are multiplied by the proliferation of short circuit pathways that are a consequence of outdoor moisture from atmospheric precipitation and yard sprinkling. In addition, prior art electric barbecue grills have not afforded the user a choice of cooking methods due, in part, to difficulties in thermally insulating electric controls from cooking heat and other problems associated with providing safe, reliable electric controls.

According to the invention, there is provided a cooking vessel with food support means above a grillwork for refractories, and at least two electric heating elements therebelow arranged in relative positions to be selectively energized for different modes of cooking. The electric leads extend through a hollow post-like housing which mounts the electric controls and the cooking vessel.

Accordingly, an important object of the present invention is to provide an electric barbecue arrangement which protects the user against accidental contact with electrically energized conductors.

A more general object of the invention is to provide a new and improved electric barbecue arrangement.

A further object of the invention is to provide an electric barbecue arrangement which is not susceptible to electrical short circuiting from inundation by overhead rain and the like.

A still further object of the invention is to provide an electric barbecue arrangement in which the electric controls are protected from detrimental conditions.

These and other objects and features of the invention will become more apparent from a consideration of the following descriptions.

BRIEF DESCRIPTION OF THE DRAWINGS

The invention, both as to its construction and its mode of use, will be better understood by reference to the following disclosure and drawings, forming a part thereof, wherein:

FIG. 1 is a perspective view of electric barbecue apparatus constructed in compliance with the principles of the present invention;

FIG. 2 is an enlarged, central cross-sectional view taken substantially along the line 2—2 of FIG. 1;

FIG. 3 is an enlarged, perspective view of the barbecue apparatus of FIG. 1 shown with the cover removed and the heating element unit raised from the cooking vessel and its support pedestal;

FIG. 4 is an enlarged, low angle perspective view showing seating of the heating element unit in the upper portion of the support pedestal;

FIG. 5 is an enlarged plan view in section taken along the line 5—5 of FIG. 3 and showing the support pedestal attachment to the leg supports;

FIG. 6 is a perspective view showing a leg support with its integral lug for attachment to the pedestal support;

FIG. 7 is a perspective view of the stationary leg support;

FIG. 8 is a perspective view of one of the wheeled leg supports;

FIG. 9 is a top plan view of the grillwork and refractory bed illustrating the energization of the inner heating element for the direct cooking mode; and FIG. 10 is a view similar to the showing of FIG. 9 but illustrating energization of the outer cooking element for the indirect cooking mode;

FIG. 11 is a circuit schematic showing the heating elements and controls therefor.

DESCRIPTION OF THE ILLUSTRATED EMBODIMENT

Referring now in detail to the drawings, specifically to FIG. 1; electric outdoor barbecue apparatus indicated generally by the reference numeral 20 comprises a porcelained steel cooking vessel unit 22 and a control housing and support post arrangement 24. The cooking vessel unit 22 includes a spherical lower vessel member or kettle bowl 26 which houses the various grates and the electric heating element arrangement, the unit 22 additionally including a spherical, heat-reflecting cover 28 which protects the contents of the kettle bowl 26.

The control housing and support post arrangement 24 comprises an upright, tubular support post 30 which is securely attached to the vessel member 26 and which terminates at its lower extremity in three radially extending, similarly configurated leg supports 32, 34 and 36. In order that the barbecue apparatus 20 may be portable, the leg supports 32 and 34 are provided with rollable wheels 38; and in order that the apparatus may be positioned with stability, the leg 36 is provided with a ground surface engaging foot 40. For facility in manipulation, an upwardly extending handle 42 is attached to the cover 28 and at least one lateral handle 44 is secured to the kettle bowl 26.

Turning to a consideration of FIG. 2, the kettle bowl 26 houses a grillwork cooking grate 46 and a grillwork support grate 48, the grate 48 being arranged to carry a number of refractory bodies 50 which define a bed beneath the grate 46. Suitably sized pumice stone fragments may be used for the refractory bodies 50. In order to provide bearing supports for the grates 46 and 48, C-shaped straps 52 are welded or otherwise fastened to the interior surface of the kettle bowl 26 at arcuately spaced locations, each of the straps 52 having an upper horizontal portion 54 upon which the grate 46 rests and a lower horizontal portion 56 upon which the grate 48 rests. The kettle bowl is fashioned with a circular rim or lip 58; and in order to provide a secure, interfitted connection, the edge of the cover is fashioned with a channel 60 of inverted L-shaped cross-section, the channel 60 telescoping over the lip 58 upon assembly therewith.

Heat for cooking is provided by an electric heating unit 62 that is situated in the kettle bowl 26 adjacent to and beneath the refractory bed grate 48. The post 30 includes an upper sleeve portion 64 which extends into the lower region of the kettle bowl 26 in order to support the heating unit 62. Cooperatively, the central, lower portion of the kettle bowl 26 is perforated and formed with an annular pendant flange 66 which abuts a circular bead 68 raised radially outwardly from the wall of post 30. The kettle bowl 26 is secured to the post 30 by means of screw fasteners 70 or other suitable means; and for purposes of promoting proper alignment of the kettle bowl 26 with the post 30, an annular collar 72 is mounted on the inside of the kettle bowl by means of arcuately spaced weldments 74, the collar 72 snugly encompassing the lower end of the upper sleeve portion 64 of post 30.

Turning to FIG. 3, the electric heating unit 62 includes a tray 76 which is affixed to the upper end of a sleeve or tubular housing 78, the heating unit 62 additionally comprising a pair of CALROD-type heating elements 80 and 82. In compliance with the present invention, the heating element 80 is spaced radially inwardly from the heating element 82 and both heating elements are configurated as loops having substantial circular extent. As a consequence, the heating element 80 may be separately energized for use in cooking by the direct mode, and the heating element 82 may likewise be separately energized but for cooking by the indirect mode, as will be described more fully hereinafter.

The electric heating unit 62 also includes an electrical cord arrangement 84 which is at least partially located within the housing 78, as is shown in FIG. 2; and when the tray 76 is fastened to the tubular housing 78 with the central intact surface of the tray closing the otherwise open end of the housing 78, the enclosed portion of the electric cord arrangement 84 is protected from heat generated at the heating elements 80 and 82 and at the bed of refractory bodies 50, as well as from descending moisture. In order to mount the tray 76 on the tubular housing 78, a number of L-shaped brackets 86 are attached to the upper end of the housing 78 by means of weldments 88, a horizontal portion of each bracket 86 extending radially outwardly of the housing 78 to be affixed to the tray 76 by screws 90 or other suitable means thus leaving air egress spaces between the brackets.

The tray 76 rests on the upper end of sleeve portion 64 in non sealing abutment with the housing 78 and its contents suspended from the tray 76; and in order to secure the tray 76 from rotating relative to the sleeve portion 64, the upper end of the sleeve portion is fashioned with upwardly opening notches 92 best seen in FIG. 3. As is shown in FIG. 4, the notches 92 are arranged to receive the horizontally extending portions of the brackets 86 in a snugly fitting manner. Proper positioning of the brackets 86 and the notches 92 also insures proper location of the knobs for the electrical controls.

With reference to FIG. 2, the electric controls for the heating elements 80 and 82 include a rheostat 94, a two-position toggle switch 96 and a signal lamp arrangement 98. Each of the electric controls is mounted on the housing 78 at a flattened sidewall portion 100, best shown in FIG. 3. The sidewall portion 100 is selected to be less than 180° in angular extent in order to prevent the housing 78 from wobbling within the post 30. In addition, power is led from a drop cord 102 to the signal lamp 98 and then to the toggle switch 96. The heating elements 80 and 82 are connected in electrical parallel and through the rheostat 94 which includes a self-contained on-off switch. The two positions of toggle switch 96 permit a selection of one or the other of the heating elements for energization but prevent current from flowing in both of the heating elements at the same time. Over-heating of the electric barbecue apparatus is thus prevented.

The rheostat 94 is attached to the flattened side portion 100 by a nut 104 as is shown is FIG. 2; and a graspable, rotatable knob 106 is affixed to the output shaft of the rheostat for convenience in selecting a desired heating level. Nuts 104 also attach the toggle switch 96 and the body of signal lamp 98 to the sidewall portion of housing 78 while a strain-relief grommet 108 holds the drop cord 102 in place.

It will be appreciated that the location of the electric controls and the electrical cord leading to the heating elements at a place within the housing 78 cooperates with the spacing of the parts from the heating elements themselves to protect the electrical parts from thermal hazards resulting from heat generated at the elements 80 and 82. It will also be appreciated that locating the housing 78 generally centrally of the kettle bowl 26 and away from the sidewall portions of the kettle bowl minimizes the amount of heat transmitted by reflection from the kettle bowl sidewall. A long use-life for the controls is thus insured.

Continuing now with reference to FIG. 3 for a description of the drainage system provided in the electric outdoor barbecue apparatus 20, the tray 76 is perforated with three drain holes 110 which serve, first, to pass liquified grease drippings from the bed of refractory bodies 50 and, secondly, to drain moisture from the region of the heating elements 80 and 82. Such moisture may accidentally invade the cooking vessel unit 22 or may be deliberately introduced for cleaning purposes. As is shown in FIG. 2, the drain holes 110 are spaced radially outwardly from the tubular housing 78 in order not to disturb the mechanical seal at the upper end of that housing, the drain holes 110 being, in addition, spaced radially inwardly from the outer edge of tray 76 to minimize the amount of grease that drips onto the inner wall of the lower portion of kettle bowl 26. For purposes of exhausting liquids from the cooking vessel unit 22, the kettle bowl 26 is perforated with a drainage hole 112; and advantageously, the hole 112 is aligned substantially vertically beneath a vertical projection of the circle defined by the three drain holes 110. Thus, the kettle bowl drain hole 112 is disposed to accept readily the liquids passing through the holes 110. Furthermore, the kettle bowl drain hole 112 is sized to discharge the maximum flow through the holes 110. For convenience, a grease-collecting drip cup 114 is attached to the tubular support post 30 beneath the kettle bowl drain hole 112 by suitable means such as a wire bracket 116 and one of the screw fasteners 70.

In order to aid in confining grease drippings to the tray 76 for controlled discharge through the holes 110, a lip 118 is upturned on the peripheral edge of the tray as is shown in FIGS. 2 and 3. Moreover, the surface of tray 76 is arranged to be imperforate, except for the holes 110, in order that the tray may effectively reflect heat upwardly toward the bed of the refractory bodies 50 and away from both the lower sidewalls of kettle bowl 26 and the electric controls contained in the tubular housing 78. Disposing the bed of refractory bodies 50 beneath the cooking grate 46 and above the heating element units 80 and 82 also reduces the occurrence of sudden bursts of flame resulting from ignition of grease drippings, the refractory bodies receiving the grease drippings directly and spreading them and absorbing them whereby to minimize the amount of grease passing toward the heating elements 80 and 82 and the tray 76.

Salient features of the construction of the leg supports are shown in FIGS. 5 and 6. There, a typical leg support is shown to include a generally horizontally extending arm portion 120 and an integral, arcuate plate portion 122, the plate portion 122 merging with the arm portion 120 at the lower extremity thereof. The arm portion 120 flares upwardly from the plate portion 122 to a narrowed ridge 124; and an integral, threaded lug 126 extends horizontally from the arm portion 120 over the plate portion 122. As will be seen in FIG. 2, the respective plate portions 122 of the several leg supports 32, 34 and 36 are aligned horizontally to establish an annular platform against which the lower end of the post 30 abuts for support; and considering FIG. 2 in conjunction with FIG. 5, the threaded lugs 126 are passed through corresponding drilled holes in the sidewall of post 30 to receive cooperatively threaded nuts 128 in assembly of the leg supports to the post. Access to the lugs 126 is afforded by the aperture defined by the inner edges of the arcuate plate portions 122. As is best shown in FIG. 2, the lower end of the tubular housing 78 is situated vertically above the region of the lugs 126 so as not to interfere with attachment of the nuts 128.

According to the features of the present invention, the leg supports 32, 34 and 36 are similarly configurated so that all the leg supports may be produced from a common mold; and to facilitate use of a given leg support as the carrier of a wheel 38 or a foot 40, each leg support terminates at its radially outward end in a drillable formation 130, best seen in FIGS. 7 and 8. As is suggested in FIG. 7, the formation 130 may be drilled and tapped vertically to receive the threaded upper end of foot 40 while the formation 130 may be equally well drilled and reamed with a horizontal bore 134 to journal the axle of a wheel 38.

Returning to FIG. 2, ends 136 of the heating elements 80 and 82 are to be noted as having been turned vertically downward and passed through appropriately fashioned holes in the tray 76. Thus, the electrical connections between the heating elements and the cord arrangement 84 are located beneath the tray 76 and within the tubular housing 78. Access by the user to these connections from above is thus prevented. Isolation of the current carrying components from the user is furthered by the provision of a bottom screen 138 which is secured at the lower end of housing 78 by means of an annular frame 140 and such suitable fastening means as self-tapping screws or weldments.

For convenience in storing the drop cord 102, a C-shaped bracket 142 is fastened to the exterior sidewall of post 30 mid-way between the kettle bowl 26 and the leg supports 32, 34 and 36, the tips of the bracket 142 being bent back less than 90° to form cord-capturing extensions 144 as is best seen in FIG. 3. The drop cord 102 may then be readily coiled on the bracket 142 as is shown in FIG. 1.

The electric barbecue apparatus 20 will be readied for use by arranging the various components as they are shown in FIG. 2. Specifically, the support grate 48 will be positioned over the heating unit 62, and a bed of refractory bodies 50 will be disposed on the grate 48. In addition, the cooking grate 46 will be situated as shown overlying and spaced above the support grate 48. In the case of the cooking of a steak or other flat meat, the refractory bodies 50 will be disposed uniformly over the support grate 48 as is shown in FIG. 9, and the heating element 80 will be energized. Primary draft is provided through the grease drain 112, with some air passing from the housing 78 between the brackets and seeping through between the end of sleeve 64 and the tray 76. Draft air and smoke pass upwardly through the open, upper portion of kettle bowl 26, cover 28 being removed for this direct cooking mode.

On the other hand, when large pieces of meat such as turkey and beef roasts are to be prepared, the refractory bodies 50 will be arranged as illustrated in FIG. 10, generally at the periphery of the support grate 48. In addition, an aluminum foil drip tray 144 will be advantageously positioned in the center of the bed of refractory bodies to collect juices for basting or the making of gravy. Furthermore, the toggle switch 96 will be operated to energize the outer heating element 82, heat being reflected toward the cooking meat from the upper sidewall portions of the kettle bowl 26 and from the cover 28, cover 28 being assembled over the kettle bowl for this indirect mode of cooking. Draft gases pass out of the cooking vessel unit through damper holes 146 in the cover 28, the flow of these gases being regulated by a damper cover plate 148 that is rotatably mounted on the cover as shown in FIGS. 1 and 2.

In the event that the cover 28 is inadvertently left off the kettle bowl 26 when the grill is not in use and should there be a fall of rain or yard sprinkling in the vicinity of a barbecue apparatus 20, water will collect on the tray 76 to exit through the drain holes 110 towards the drain hole 112 in the kettle bowl from whence it will pass to the exterior. In the event of extreme flooding, water will pass over the upturned lip 118 of tray 76 to wash down the lower sidewall portion of the kettle bowl to exit through the drain hole 112. Should there be partial flooding of the kettle bowl 26, the upper sleeve portion 64 of the post 30 serves as a standpipe to exclude water from the several electrical controls.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. An electric barbecue arrangement comprising: cooking vessel means with food support means associated therewith and having an open top defined by an outer lip and a generally centrally disposed portion inwardly of said lip; housing means, including a hollow member connected to said cooking vessel means at said centrally disposed portion; electric heating means, including heating element means mechanically mounted on said hollow member and electrical cord means disposed within said hollow member for protection, said heating element means further including a first, radially inwardly disposed heating element loop for use in a first cooking mode and a second heating element loop disposed radially outwardly of said first heating element loop for use in a second cooking mode; grill work means mounted in said vessel means for supporting a refractory bed adjacent and in heat exchange relationship with said heating element means; and electrical control means for said heating element means disposed in said hollow member to be thermally protected from heat emanating from said heating element means and said refractory bed, said control means including means for selectively energizing the first and second heating element loops whereby to accomplish cooking by either the first or second mode.

2. An electric barbecue arrangement according to claim 1 wherein said heating element means is mounted on said hollow member underlying said grillwork means.

3. An electric barbecue arrangement according to claim 1 wherein said electric control means includes switch means for selectively energizing said first and second heating element loops independently.

4. An electric barbecue arrangement according to claim 1 wherein said heating element loops are disposed in substantially co-planar relationship.

5. An electric barbecue arrangement according to claim 1 wherein said electric heating element means further includes surface means disposed between said hollow member and said heating element means for shielding said hollow member.

6. An electric barbecue arrangement according to claim 5 wherein said surface means includes drain hole means disposed out of alignment with said hollow member for emptying liquids into a lower portion of said cooking vessel means.

7. An electric barbecue arrangement according to claim 6 wherein said lower portion includes second drain hole means for discharging liquids exteriorly of said cooking vessel means.

8. An electric barbecue arrangement according to claim 1 which further includes tubular support post means connected to the centrally disposed portion of said cooking vessel means, said support post means telescopingly receiving said housing means to cooperate in connecting said hollow member to said cooking vessel means, said support post means including an upper sleeve portion upstandingly disposed in the lower portion of said cooking vessel means.

9. An electric barbecue arrangement according to claim 8 wherein said electric heating means further includes surface means disposed between said hollow member and said heating element means for shielding said hollow member, said surface means being supported by said upper sleeve portion.

10. An electric barbecue arrangement according to claim 9 wherein said surface means includes drain hole means disposed out of alignment with said hollow member for emptying liquids into a lower portion of said cooking vessel means outside said upper sleeve portion.

11. An electric barbecue arrangement according to claim 10 wherein said lower portion includes second drain hole means disposed radially outwardly from said upper sleeve portion for discharging liquids exteriorly of said cooking vessel means.

* * * * *